United States Patent [19]
Root et al.

[11] 3,803,875
[45] Apr. 16, 1974

[54] METHOD OF FORMING TITANIUM METAL-GLASS HERMETIC SEALS

[75] Inventors: Floyd A. Root; Robert C. White, both of Sidney, N.Y.

[73] Assignee: The Bendix Corporation, Southfield, Mich.

[22] Filed: Feb. 5, 1973

[21] Appl. No.: 329,708

[52] U.S. Cl.................... 65/43, 65/59, 117/124 A, 161/193
[51] Int. Cl..................... C03c 27/00, C03c 27/04
[58] Field of Search ................. 65/43, 59; 161/193; 117/124 A; 423/297, 298

[56] References Cited
UNITED STATES PATENTS

| | | | |
|---|---|---|---|
| 2,771,969 | 11/1956 | Brownlow | 161/193 X |
| 3,529,349 | 9/1970 | Van De Schoot et al. | 65/43 X |
| 2,839,367 | 6/1958 | Stern et al. | 423/298 |
| 2,620,598 | 12/1952 | Jotling-Purser et al. | 65/43 |

OTHER PUBLICATIONS

Partridge; Glass-To-Metal Seals; 1949; Society of Glass Technology; pages 37, 38

Berg et al.; "Ceramic to Aluminum Seal"; RCA Technical Notes No. 124; Mar. 12, 1958, 65–59

*Primary Examiner*—S. Leon Bashore
*Assistant Examiner*—Kenneth M. Schor
*Attorney, Agent, or Firm*—William G. Kratz, Jr.

[57] ABSTRACT

A hermetic seal is formed between a metal article, containing a major portion of titanium, and glass by forming a boron-oxide coating on the article, heating the article to a temperature in excess of the melting point of boron oxide to form a boron-containing film on the article and then contacting the article and glass and firing the unit.

14 Claims, No Drawings

METHOD OF FORMING TITANIUM METAL-GLASS HERMETIC SEALS

BACKGROUND OF THE INVENTION

This invention relates to the formation of a hermetic seal between a metal and glass, and more specifically to the formation of such seals between a metal article containing a major portion of titanium and a glass component. The method is especially useful in the formation of header units containing electrical contacts, where glass is used as a dielectric, with the formation of pressure resistant hermetic seals between a housing and the contacts.

The formation of hermetic seals between a metal and a glass is difficult to achieve due to the non-adherence of these materials together. Such seals are required however in the making of electrically conductive components which are intended for use in metallic housings. In such components, glass is normally used as a dielectric and insulates a metal conductor from the remainder of a housing. Such a seal is, for example, described in U.S. Pat. No. 3,356,466 in which a ceramic ring is used intermediate two sections of glass, while the glass insulates a conductor from the housing in which the seal would be placed.

Especially difficult to bond to glass is the metal titanium and the alloys of this metal, while such metal is excellently suited for use in high pressure housings as corrosion resistant seal components. We have found that by specifically treating such a metal, with formation of a boron-containing film on the surface of the metal component that is to be sealed to the glass, excellent high pressure, hermetic seals can be produced.

SUMMARY OF THE INVENTION

The present method for bonding a metal article containing a major portion of titanium to glass is characterized by contacting the surface of the metal to be bonded to the glass with a solution of boron oxide. The article is dried and a coating of boron oxide formed on the article, the article then being heated, under an inert atmosphere, above the melting point of boron oxide whereby a boron-containing film is formed on the surface. The glass is then brought into contact with the surface having the boron-containing film and the unit is heated to fire the unit, to a temperature of about 1,650° to 1,850°F., under an inert atmosphere, so that a hermetic seal is formed between the metal article and the glass.

DESCRIPTION OF THE INVENTION

In accordance with the present invention, hermetic seals are formed between a titanium metal article and glass. The metal articles contain a major portion of titanium and may comprise the metal itself or various alloys formed from this metal, for example, an alloy comprising titanium, with 6 percent aluminum and 4 percent vanadium. For the purpose of simplicity, the following description will use the term titanium metal article while it is understood that various alloys containing a major portion titanium are encompassed.

The titanium article, following cleaning so as to remove grease or other impurities, has formed thereon a boron-oxide coating, which coating must cover at least the surface of the titanium article that is to be bonded to the glass.

In order to effect the complete coating of the surface to be bonded, the titanium article is contacted with a solution of boron oxide. As is known, boron oxide is soluble in various alcohols, such as lower aliphatic alcohols, as well as in water, and such solvents are usable for forming of the solution. While the solvent need only be such as to dissolve boron oxide, while being chemically inert relative to metal, it is preferred to use a solvent such as methanol which will dissolve sufficient boron oxide and which is also relatively volatile so that the solvent is readily removed through drying of the article. A concentrated solution of boron oxide in alcohol, such as a 20 percent by weight boron-oxide solution in methanol, is preferred. While slightly heated solutions of boron oxide, with resultant increased solubility, may be used, room temperature solutions are suitable for use and preferred.

The titanium metal article may be dipped in the boron-oxide solution to sufficiently wet the surface of the article with the solution. The article is then removed from the solution and air dried. The drying of the article, following contact with the solution, will result in the formation of a boron-oxide coating on the article. The article should be coated over substantially the entire surface of the article that is to be bonded to a glass and bare spots on the surface may be again contacted with the boron-oxide solution, if necessary.

The titanium metal article, having the coating of boron oxide is next heated so as to convert the coating to a film. The article is heated, in an inert atmosphere such as argon, helium, or the like, with the exclusion of oxidizing or reducing gases, to a temperature above the melting point of boron oxide. Heating to this temperature liquifies the boron-oxide coating and forms a film over the surface of the titanium metal article. Temperatures at which the boron oxide has been found to be sufficiently flowable for film formation are temperatures in the range of 1,050° to 1,200°F. The time required for the heating is that sufficient to enable a flowable boron oxide to form a film on the titanium article. The titanium metal article, upon formation of a boron-oxide film upon the surface to be bonded to glass is next cooled and examined to insure that the film covers the necessary glass contact area.

To bond the titanium metal article to glass, the article with the boron-oxide film on the surface thereof is abutted, or brought into contact, with the glass and the unit fired or glassed to complete the bonding and form the hermetic seal. The unit so formed is heated, under an inert atmosphere such as argon, helium, or the like. The temperature to which the unit must be heated to form a bond between the glass and the titanium metal oxide, by fusing therewith of the boron-oxide film, is on the order of 1,650° to 1,850°F. for a length of time sufficient to form a flowable glass and effect fusion of the boron-oxide film, glass, and titanium metal article.

Following firing of the article, the titanium metal article with the glass bonded thereto by a hermetic seal is cooled and excess boron-oxide film, if present on the article, may be readily removed by water washing.

As an example of the use of the present process, a header was formed which contained glass tubes, having molybdenum electrical contacts extending through the tubes, that were inserted through bores in the header and hermetic seals formed between the glass tubes and header. A titanium alloy header, the alloy comprising titanium, 6 percent aluminum and 4 percent vanadium, having bores therethrough, was washed thoroughly in a Freon-type solvent. The titanium header was dipped in a solution of 20 percent by weight of anhydrous boron oxide in methanol and air dried. Inspection showed all surfaces of the header to be uniformly coated with a boron-oxide coating. The header was placed in a retort and the retort sealed, with a flow of argon gas initiated. While maintaining a flow of argon gas, the header was heated to a temperature of 1,100°–1,150°F. until a film of boron oxide was formed on the header. The header was cooled, while maintaining argon gas flow. Glass tubes, of a borosilicate glass similar to Corning No. 7052 glass, each containing a molybdenum contact therethrough, were inserted into the bores of the titanium alloy header, which bores contained a film of boron oxide on the surface. The assembly was placed in a retort and an argon gas flow initiated. While maintaining the argon gas flow, the assembly was heated in a furnace to 1,700°F., this temperature being maintained within ±10°F. for 15 minutes. The retort, containing the assembly, was removed from the furnace and cooled, while maintaining the flow of argon gas. The assembled header was washed with warm water, ca 120°F., and air dried. The assembled header, so produced, had hermetic seals between the titanium metal header and the glass tubes and was pressure resistant to above 20,000 psi.

There has been described a method of treating a titanium metal article to render the surface thereof bondable to glass and a method for forming hermetic seals between such a metal article and glass. Such a method is excellently suited for forming pressure resistant seals and provides an efficient method for their formation.

We claim:

1. Method of bonding a titanium metal article to glass and forming a hermetic seal therebetween comprising; dissolving boron oxide in a solvent to form a solution, contacting the surface of the metal article to which the glass is to be bonded with the boron-oxide solution, drying said surface to remove the solvent and form a coating of boron oxide on said surface, heating said surface above the melting point of boron oxide under an inert atmosphere to form a boron-containing film on said surface, abutting the glass to the boron-containing film on said surface, heating the glass and metal article so abutted, under an inert atmosphere to a temperature sufficient to render the glass flowable and, cooling said article to form a hermetic seal between the metal article and the glass.

2. The method defined in claim 1 wherein said solvent is selected from lower aliphatic alcohols and water.

3. The method defined in claim 2 wherein said solvent is methanol and wherein said boron oxide is present in an amount of about 20 weight percent.

4. The method defined in claim 1 wherein said surface containing the coating of boron oxide is heated to a temperature of between 1,050° to 1,200°F. to form said boron-containing film thereon.

5. The method defined in claim 4 wherein said inert atmosphere during said heating comprises argon gas.

6. The method defined in claim 1 wherein said boron-containing surface and said glass, following abutment, are heated to a temperature between about 1,650° to 1,850°F.

7. The method defined in claim 6 wherein said inert atmosphere, during heating of the abutted glass and metal article, comprises argon gas.

8. The method defined in claim 1 wherein said metal article comprises a titanium alloy containing 6 percent aluminum and 4 percent vanadium.

9. Method of bonding a titanium metal article to glass and forming a hermetic seal therebetween comprising; forming on said surface a boron-oxide coating by contacting said surface with a solution of boron oxide in a solvent and drying said surface to remove the solvent, heating said surface above the melting point of boron oxide under an inert atmosphere to form a boron-containing film on said surface, and adhering said surface having the boron-containing film thereon to glass by firing the same in contact therewith at an elevated temperature at which the glass is flowable.

10. The method as defined in claim 9 wherein said solution is comprised of boron oxide in a solvent selected from lower aliphatic alcohols.

11. The method defined in claim 10 wherein said lower aliphatic alcohol is methanol and said boron oxide is present in said methanol in an amount of about 20 percent by weight.

12. The method defined in claim 9 wherein said surface is heated to a temperature in a range of 1,050° to 1,200°F.

13. The method defined in claim 12 wherein said inert gas is argon.

14. The method defined in claim 9 wherein said metal article contains a major portion of titanium.

* * * * *